Patented July 1, 1924.

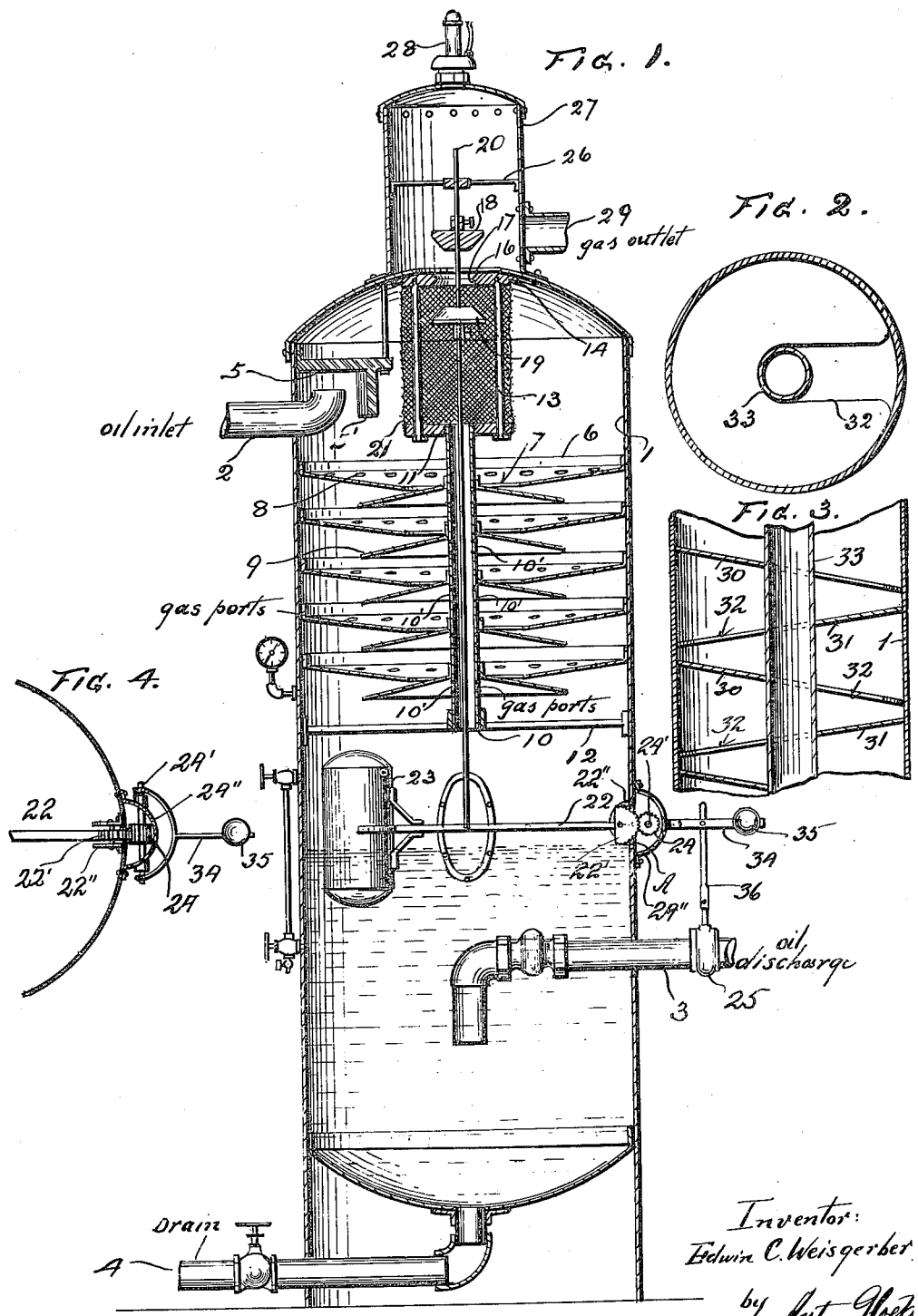

1,499,710

UNITED STATES PATENT OFFICE.

EDWIN C. WEISGERBER, OF LONG BEACH, CALIFORNIA.

GAS AND OIL SEPARATOR.

Application filed February 13, 1924. Serial No. 692,476.

*To all whom it may concern:*

Be it known that I, EDWIN C. WEISGERBER, a citizen of the United States, residing at Long Beach, county of Los Angeles, and State of California, have invented a certain new and useful Gas and Oil Separator, of which the following is a specification.

My invention relates to an apparatus for separating the gaseous from the fluid and solid constituents of oil, and the object of the invention is to liberate the maximum gas content associated with the oil flowing or pumped directly from the well.

Another object of the invention is to provide an apparatus in which a natural separation of the gas from the oil may occur with very little loss of the lighter constituents and to provide a means whereby the oil is kept constantly in a very thin, filmy state whereby the gas frees itself from the oil body and accumulates in the apparatus for subsequent use. Other objects will appear from the following specification, in connection with the accompanying drawing, in which—

Fig. 1 is a sectional elevation of an apparatus embodying my invention.

Fig. 2 is a horizontal, sectional view of a modified form of baffling plate,

Fig. 3 is a fragmentary elevation of same, and

Fig. 4 is a section on line 4—4, Fig. 1.

The invention comprises the usual arrangement of pressure chamber 1, having an oil inlet 2 at the top and an oil outlet 3 at or near the bottom of the chamber for permitting the oil to flow off after the gaseous content has separated therefrom and for maintaining a definite oil level within the chamber. In the bottom of the chamber 1, is a valved drain pipe 4 for the sand, water and other foreign substances, delivered to the chamber with the oil. In the path of the discharge end of the oil inlet pipe 2 is a splash and wear plate 5, which protects the apparatus against the disintegrating effects of the inflowing oil, with its accumulation of sand and grit. This wear plate 5 extends and is supported horizontally of the chamber 1 and is formed with a dependent wall 5' for confining the oil, after it strikes the underside of the wear plate, within a definite area. In the upper end of the chamber 1, and below the inlet pipe 2 for the oil, is a plurality of horizontally disposed dished baffles 6 which are secured to the walls of the chamber 1 in any manner and each of which is provided with a central opening 7 and with a plurality of circumferentially arranged ports 8 through which the gases, liberated from the oil, may escape to the top of the chamber, as hereinafter pointed out. Cooperating with the baffles 6, is a plurality of downwardly deflected baffles 9, diametrically smaller than the baffles 6, and extending in line with the openings 7 in the baffles 6, whereby the oil in descending traverses the baffles 6 and 9 in zig-zag manner, at the same time being spread in a thin film, and liberating the gas, which rises through the ports 8 in the baffles 6 and through the central openings in the baffles.

The baffles 9 are fastened in any suitable manner upon a section 10 of pipe, which is disposed centrally of said chamber 1, and depends from a plate 11 to which it is screwed or otherwise fastened. Lateral ports 10' are provided in the pipe 10 to enable whatever gas may gather under the baffles to escape. The free end of said pipe section 10 is held rigid by a suitable brace 12. The aforenamed plate 11, is supported by a plurality of rods 13 which may be threaded in a complementary plate 14 riveted or otherwise attached to the underside of the top of the chamber. This plate 14 is provided with a central opening 15, the embracing walls of which are shaped to form an upper valve seat 16 and a lower valve seat 17, for a plurality of valves 18 and 19, respectively, mounted on a stem 20, and operating, as presently explained.

The plates 11 and 14, are, as seen, spaced from each other by the rods 13, and support a cylindrical screen 21, provided to arrest particles of oil that are entrained by the gas which is under pressure and to prevent them from being carried into the gas line. The stem 20, on which are adjustably mounted the valves 18 and 19, is attached at one end to a float lever 22, carrying a float 23. This float lever 22, is rigidly attached to a gear segment 22', extending through a slot A, and journaled in ears 22'' secured upon the inside of, the chamber. The gear segment 22' meshes with a gear 24, keyed upon a trunnion 24' which extends transversely through a box or closure 24'', and upon this trunnion is mounted for movement therewith a fulcrum lever 34, carrying an adjustable weight 35, for overbalancing the float.

Approximately centrally of said fulcrum lever 34, is pivoted a downwardly extending bar 36, which is pivotally attached to a valve 25, in the oil outlet pipe 3. This float 23, through its associated connections regulates and maintains a definite level of the oil in the chamber 1.

In normal inoperative position, the float 23, will gravitate as low as the limit of movement of the valves 25 and 18 will permit, both these valves obviously being closed when the chamber is empty of oil. When the oil is admitted to the chamber it accumulates in the bottom thereof and the gas accompanying the oil is equally diffused throughout the chamber, being prevented from escaping therefrom by the seated valve 18. The oil gravitates slowly to the bottom of the chamber and being caused to spread over the baffles in attenuated films, releases the gas which creates a pressure within the chamber and prevents succussion of the fluids. The float 23, rising with the level of the oil, gradually opens the valves 25 and 18, the former permitting the oil to escape through the overflow pipe 3, and the latter relieving the gas pressure within the chamber. When the oil is delivered to the chamber in quantities in excess of the discharge of same from the chamber 1, the float 23, will open the valve 25 to its limit, at the same time seating the valve 19. Therefore the accumulating gas pressure will be exerted upon the oil in the chamber and the gravitational discharge of the oil through the overflow pipe will be aided by the gas pressure, such pressure being continued until practically an equilibrium is established. When the inflow of oil is balanced or nearly so, with the overflow, the parts are in substantially the position shown in Fig. 1.

The stem 20 extends through a suitable guide 26 in the gas dome 27, surmounting the chamber 1 and communicating with the interior of the chamber. A safety valve 28, and a gas outlet 29, are also provided on said dome.

In Figs. 2 and 3, I have illustrated a varied form of baffling arrangement and it consists of annular plates 30 disposed at one angle to the horizontal, and annular plates 31, disposed at another angle to the horizontal, the plates of different angles alternating, as shown. Each plate is provided with a slotway 32, extending inwardly from the peripheral edge thereof, the inner terminus of the slot conforming to a tubular body shown at 33 and corresponding to the tubular body shown in Fig. 1. The oil in this arrangement traverses the inclined plates, successively escaping from one to another through the slotways 32.

What I claim, is:

1. A gas and oil separator comprising a chamber, an oil and a gas inlet on said chamber and a gas outlet in the top of said chamber, a splash and wear plate disposed in the path of discharge of the oil and gas, a plurality of dished baffles below said splash plate, each having a central opening, a plurality of inverted dished baffles co-operating with said first-named baffles to cause the oil to flow in a zig-zag course to the bottom of the chamber, a central hollow support for said dished baffles, an overflow pipe near the bottom of said chamber, a valve in said pipe, a lever connected to said valve and having a float for maintaining the level of the oil in said chamber, a stem connected with said float lever and having thereon adjustable valves for opening or closing the outlet in the top of said chamber, and a means to arrest entrained oil particles.

2. A gas and oil separator comprising a chamber having an oil and gas inlet, and a valved discharge pipe at or near the bottom of said chamber, a plurality of superposed dished baffles mounted within said chamber and each baffle provided with a central opening and with a row of circumferential ports, a plurality of superposed baffles co-operating with and extended in line with the opening in said first-named baffles to cause the oil to flow in a zig-zag course to the bottom of the chamber, a hollow support for the second named baffles, a float lever pivoted within said chamber, a connection between said float lever and valve, a valve seat in the top of said chamber, a stem extending through said seat and carrying two valves, said stem pivotally associated with said float lever and said valves operable in synchronism with the valve on said discharge pipe, and a screen to arrest oil particles carried by the gas.

3. A gas and oil separator comprising a chamber having an oil inlet and a valved discharge pipe, and provided in the top thereof with a gas outlet port, a float lever connected with the valve of said discharge pipe to maintain a definite level in said chamber, a stem pivotally connected to said float lever and extending through the gas port in the top of said chamber, two valves adjustably mounted on said stem, one inside the chamber and the other outside the chamber and operable synchronously with the movement of the valve in said discharge pipe to confine the gas within said chamber, and means to prevent the escape of oil particles with the gas.

4. A gas and oil separator comprising a chamber having an oil inlet and a valved discharge pipe at or near the bottom thereof, and provided in the top thereof with a gas outlet port, a float lever connected with the valve of said discharge pipe to maintain a definite oil level within the chamber, a stem pivotally connected with said float lever and extending through the gas port in the top of said chamber, valves adjustably mounted on said stem and co-operating with said valve in the discharge pipe to confine the gas within said chamber, a baffling means in the chamber for thinning the oil in its flow from the top to the bottom of the chamber and liberating the gas, said baffling means provided with gas ports.

5. A gas and oil separator comprising a chamber having in the top thereof a gas outlet port, an oil inlet near the top of said chamber, and a discharge pipe at or near the bottom of said chamber, a plurality of baffle plates within said chamber, each having a central opening, a plurality of complementary baffle plates extending approximately within the openings in said first-named baffles, said baffles arranged to thin the oil and liberate the gas, a support for said complementary baffles comprising a hollow member provided with lateral ports, means for carrying said support from the top of said chamber, a float lever pivoted in said chamber, a valve on said discharge pipe, a connection between said float lever and the valve on said discharge pipe, and a means to control the gas port in the top of said chamber, comprising a stem connected with said float lever, and a plurality of valves adjustably mounted on said stem.

In testimony whereof I have set my hand.

EDWIN C. WEISGERBER.